Patented Mar. 1, 1938

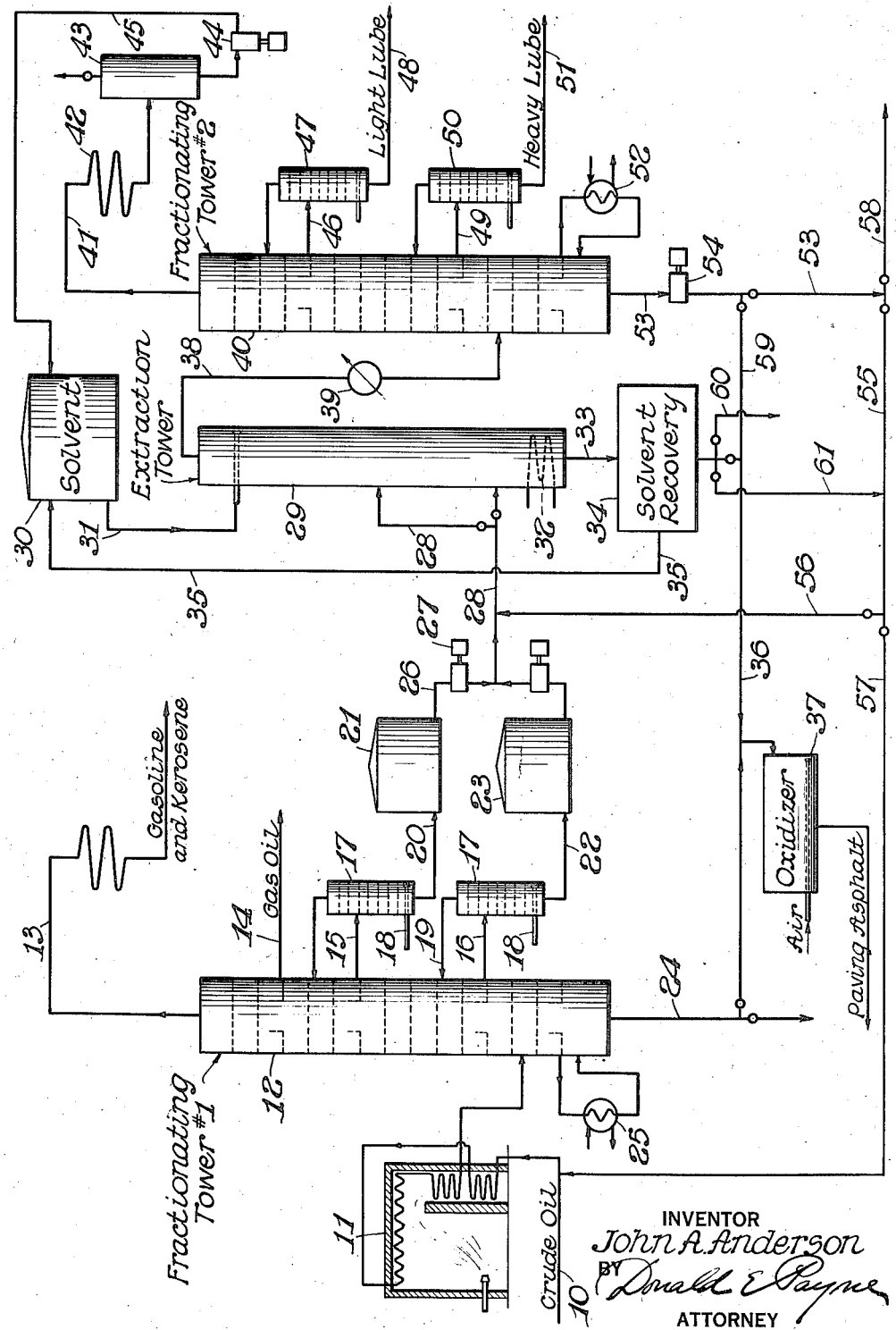

2,109,895

UNITED STATES PATENT OFFICE 2,109,895

LUBRICATING OIL REFINING

John A. Anderson, Chicago, Ill., assignor to Standard Oil Company, Chicago, Ill., a corporation of Indiana Application November 19, 1934, Serial No. 753,621

5 Claims. (Cl. 196—13)

This invention relates to lubricating oil refining and it pertains more particularly to a method and means of obtaining high quality oils from mixed base crudes without the use of large amounts of clay.

For many years lubricating oils have been refined by acid treating followed by clay contacting. More recent practice includes the step of removing naphthenic components by means of a selective solvent such as phenol, dichlorethyl ether, nitrobenzene, furfural, cresylic acid, aniline, chloraniline, chlorphenols and cresols, $SO_2$-benzol mixtures, wood tar acids, and mixtures of the above solvents with each other or with other solvents. The solvent extraction processes markedly improve the viscosity index of the oils (i. e. decrease their susceptibility to viscosity change with change in temperatures), but they do not remove all of the color bodies and sludge-forming bodies which are removed by the more severe acid and clay treatments. The object of my invention is to provide a simple and inexpensive means for removing these color bodies, sludge-forming constituents and other impurities from solvent extracted lubricating oils without the use of heavy acid treatments and particularly without the use of large amounts of clay.

I have found that stability against oxidation in sludge formation is not a function of extent of treatment with selective solvents, but that this oxidation and sludge stability vary directly with the color which is obtained by clay contacting. Clay contacting, however, is one of the most expensive steps of the oil refining process and it is my object to reduce the amount of clay required to a minimum or to avoid entirely the necessity of using a clay contacting step to obtain the desired color, color stability, and stability against oxidation, sludge formation, discoloration, ring sticking, etc.

A further object is to provide an improved method and means for combining selective solvent extraction and distillation systems whereby maximum yields of high quality lubricating oils may be obtained at a minimum expense and wherein impurities and objectionable substances are separated from the oils by simple, inexpensive distillation processes and recycled for elimination in other parts of the system instead of requiring expensive acid and clay treatments. A further object is to provide an improved means for removing heavy naphthenic and sulfonic soaps and other impurities from lubricating oil stocks. Other objects will be apparent from the following detailed description.

My invention is essentially a three-step process wherein the oil is first deasphalted, the asphalt-free oil is solvent extracted, and the solvent extracted oil is finally distilled under non-cracking conditions, leaving a low bottom which may be recycled to the deasphalting or extraction systems. I have discovered that if the extraction step on the deasphalted oil is sufficient to give a raffinate having a viscosity index of at least about 92, the objectionable color bodies and the impurities, which bring about oxidation instability, color instability, sludge-forming tendencies, etc., may be removed from the highly extracted oils by simple distillation.

It has been already proposed to solvent extract a residual oil and to subsequently fractionate the raffinate by distillation, but my invention distinguishes from this practice in three important respects: In the first place, I deasphalt my lubricating oil stock prior to the solvent extraction step; in the second place, I employ a sufficiently thorough extraction step to insure a viscosity index of at least about 92; and, in the third place, I redistil the final raffinate to very low bottoms, or, in other words, prepare distillate heavy oils as distinguished from merely separating light distillates from heavy residuals. I have discovered that by employing this sequence of steps and by employing an extraction step of the stated severity, I can practically eliminate the expensive clay treating or clay contacting steps and at the same time obtain a superior lubricating oil having excellent color, color stability, oxidation stability, and viscosity index. The invention will be more clearly understood from the following detailed description.

The accompanying drawing forms a part of this specification and diagrammatically illustrates a preferred elevational plan of my improved system.

I will describe my invention as applied to the manufacture of S. A. E. 20 and S. A. E. 50 lubricating oils from Mid-Continent crude, but it should be understood that the invention is equally applicable to any lubricating oil stock which contains asphaltic and naphthenic constituents, color bodies, and sludge-forming constituents. The invention is also applicable to the refining of waxes, white oils, synthetic oils, etc., as will be apparent to those skilled in the art.

Crude oil from line 10 is passed through pipe still 11 and introduced into fractionating tower 12, gasoline and kerosene being withdrawn from the top of the tower through line 13, gas oil from an upper plate through line 14, light lubricating oil through line 15, and heavy lubricating oil through line 16. The lubricating oil fractions are preferably withdrawn to strippers 17 into which steam is introduced through lines 18 and from which vapors are returned to the towers through lines 19, the light oil being withdrawn through line 20 to storage tank 21 and the heavy oil being withdrawn through line 22 to storage tank 23. It should be understood that this is a diagrammatic representation of distillation equipment and that in actual use further lubricating oil fractions will probably be recovered in a separate fractionating tower with the aid of a vacuum and stripping steam. For the purpose of my invention, it is sufficient to state that both the light and heavy lubricating oil fractions are separated from the asphalt in the crude by distillation so that this asphalt will not interfere with the later solvent extraction and the final distillation steps. The asphalt is removed from the tower through line 24 and suitable reboiling means 25 may be employed for insuring the removal of valuable lubricating oils from the asphalt.

The lubricating oil distillates may be admixed before solvent extraction, but I prefer to solvent extract the light oils separately from the heavy oils and in the present description storage tank 21 contains S. A. E. 20 lubricating oil stock and tank 23 contains S. A. E. 50 stock.

First, I may introduce the S. A. E. 20 stock through line 26, pump 27 and line 28 into selective solvent extraction tower 29. Solvent from tank 30 is introduced at the top of the tower through line 31. A cooling coil 32 at the base of the tower insures maximum yields of good oil in the raffinate. Extract is withdrawn from the base of the tower through line 33 to solvent recovery system 34, the solvent being returned by line 35 to tank 30 and the extract being removed through line 36. This extract may be blended with asphalt from line 24 and the blend may be oxidized in tank 37 for the production of paving asphalt.

The raffinate leaves the top of the solvent extraction tower through line 38 and passes through pipe still or heater 39 to a second fractionating tower 40. Solvent is removed from the top of tower 40 through line 41 and is condensed in coils 42 and passed through trap 43 in pump 44 and line 45 back to solvent storage tank 30. The finished lubricating oil may be separated in one or more fractions. The light fraction may be withdrawn from an upper plate through line 46, passed through steam stripper 47 and thence through line 48 to storage while a heavier fraction may be withdrawn through a lower plate through line 49 and passed through steam stripper 50 and line 51 to storage. Reboiling means 52 are provided at the base of the tower and the final residue or bottoms which in this case include the color bodies, the potential sludge-forming constituents and other undesirable impurities, are removed from the base of the tower through line 53. These impurities may be forced by pump 54 back through lines 55 and 56 to line 28 for re-extraction, but they are preferably either returned through line 57 for admixture with incoming crude or withdrawn through line 58 for fuel or for the preparation of specialty products. I may, however, pass these bottoms through line 59 to line 36 for admixture with asphalt and/or naphthenic material from fractionating tower 1 and extraction tower 29, respectively. Also, the naphthenic material from solvent recovery apparatus may be passed through line 59 to line 53 and recycled through lines 55 and 56 to the extraction tower or returned through line 57 to the initial distillation step. The naphthenic components may be withdrawn from the system through line 60 or passed through line 61 for recycling instead of being blended with the asphalt, as hereinabove described.

It should be understood that this drawing is diagrammatic and that the particular apparatus used in any step has no bearing on the present invention. The solvent extraction may just as well be effected in a multiple-batch countercurrent system and, in fact, I have found that the multiple-batch countercurrent process is highly desirable because it insures intimate contact between the solvent and the oil (channeling may take place in the tower) and it makes possible the effective use of different temperatures in different stages. In practicing my invention, it is necessary to obtain a viscosity index of about 92, which means that for some oil stocks the extraction step is quite severe.

The final distillation should be effected under vacuum and with the aid of steam so that there will be no decomposition or cracking of the finished lubricating oil. Distillation equipment for this purpose is well known and forms no part of the present invention. In this operation I may obtain several fractions of differing viscosities from which the desired grades of lubricating oils may be blended.

I have discovered that when M. C. 20 distillate having a true color of 303 is charged from tank 21 into the extraction system and treated countercurrently witht 2½ volumes of dichlorethyl ether using 4 stages at 75° F., I obtained a raffinate oil having an N. P. A. color of 4½+ and a viscosity index of about 95. If this oil is percolated to color with No. 1 Attapaulgus clay, the requirement is about 2,000 gallons per ton and the finished oil has an N. P. A. color of 1½ to 2 and a viscosity index of 96. When this same oil is finished in accordance with my invention by distilling the raffinate under noncracking conditions to very low bottoms (about 3% to 4%), the finished oil has an N. P. A. color of 1½ to 2 and a viscosity index of 98. If this redistilled raffinate is then given a light clay treatment, its color may be readily improved to 1 to 1½ N. P. A. The distillation loss of 4% is no greater than the loss which would occur in the percolation step and the expense of redistillation is extremely small as compared to the expense of the percolation treatment.

In the above example the distillation was effected at a pressure of about 8 millimeters and at a temperature of 460° to 630° F., and it will be understood that in commercial practice steam may be used to supplement the vacuum distillation. It is very interesting to note that the raffinate which was finished by percolating through clay had a viscosity at 210° F. of 48 and at 100° F. of 227 seconds Saybolt while the redistilled raffinate had a viscosity at 210° F. of 47.5 and at 100° F. a viscosity of 210 seconds Saybolt. Thus the viscosity index of the oil is actually improved by this redistillation step. I have found that the color obtained by this redistillation is extremely stable and that the oil is stable against oxidation and sludge formation. When a light clay treatment is employed after the redistillation, a color and stability are obtained which are impossible from the use of the clay treatment by itself.

Tests with Mid-Continent S. A. E. 50 motor oil distillate show the importance of carrying the selective solvent extraction to obtain a viscosity index of 92 or better before the redistillation step. In two runs with S. A. E. 50 stock, the first was extracted with two dumps of a 1 to 1 chlorex-oil ratio and the second one was extracted with eight dumps of a 0.5 to 1 chlorex-oil ratio, both extractions being carried out at 75° F. Both raffinates were redistilled at about 1 to 1½ millimeters pressure and at a temperature below 680° F. The first run was only carried to 10% bottoms in the redistillation step and it was found that the true color of the redistilled oil was 48, the Saybolt viscosity at 210° F. was 88, and its viscosity index was only 86. Its oxidation stability (hours required for formation of 10 milligrams of asphaltenes undergoing oxidation at 341° F.) was 28 and its color stability was poor. In the second run, after the more severe extraction step, the redistillation was carried to only 4% bottoms, yet the true color of the redistilled oil was 12, its 210° F. viscosity was 81 seconds Saybolt, its viscosity index was 92, its oxidation stability was 80, and its color stability was good. If the solvent extraction is carried out to give a viscosity index of 92 or above, the redistillation step will give a lubricant of good color stability and oxidation stability even in the absence of clay contacting.

Small amounts of undesirable substances may be formed in or carried over in the redistillation step and it is therefore sometimes desirable to give a redistilled heavy lubricant a light clay treatment, which will give an oil of excellent color and oxidation stability.

Color stability was tested by placing 25 cc. of the oil in a 4 ounce bottle in a room at 200° F. for 20 hours. The redistilled oil, after adequate solvent extraction, forms very little color in this test,—it will not become more than ½ N. P. A. unit darker.

A feature of my invention is the fact that the small bottoms from the redistillation step need not be wasted as is the loss in the percolation step, but it may be returned for admixture with incoming crude, so that the color bodies are continuously removed from the system with the asphalt. Alternatively, it may be introduced into the solvent extraction system and the undesirable constituents removed therefrom with the extract. By thus recycling the bottoms from the redistillation step I can substantially eliminate losses which would otherwise occur in this finishing step. I may make allowance for the bottoms in the second distillation step by taking a little longer cut in the first distillation. About 4% or 5% bottoms is usually all that have to be withdrawn from the redistillation step.

While I have described an initial distillation step for removing asphalt from the lubricating oil stock prior to the solvent extraction treatment, I also contemplate the removal of this asphalt by propane deasphalting and/or by preliminary acid treatments. I have found that the solvent extraction step is much more effective when preceded by this deasphalting step and although I prefer to separate the asphalt by distillation and to use heavy distillate stocks, it should be understood that my invention is not necessarily limited thereto. However, my invention should not be confused with the prior practice of merely solvent extracting the long residuum and subsequently splitting the raffinate into light and heavy fractions. My invention requires substantially complete distillation of the raffinate, leaving only about 3% or 4% bottoms and furthermore, to obtain color and sludge stability, I have found that the solvent extraction step must be carried forward to obtain at least 92 V. I. raffinates.

If the oil is given a preliminary acid treatment, either for the purpose of deasphalting or for supplementing the deasphalting step, it may be necessary to neutralize the sour oil and in this manner sulfonic soaps may be formed which are very difficult to remove, particularly from S. A. E. 50 lubricating oil stocks. I have discovered that my redistillation step after the solvent extraction is very efficient in removing these sulfonic soaps from the lubricants as well as removing the objectionable color bodies and sludge-inducing materials.

While I have described in detail preferred embodiments of my invention, it should be understood that I do not limit myself to any of the details hereinabove set forth except as defined by the following claims which should be construed as broadly as the prior art will permit.

I claim:

1. The method of preparing high quality lubricating oil from lubricating oil stocks containing asphalt, naphthenic constituents, and objectionable color bodies and sludge-forming constituents, which method comprises deasphalting said lubricating oil stock, extracting said deasphalted oil with a selective solvent to obtain a raffinate having a viscosity index of at least 92, and redistilling said raffinate under non-cracking conditions to about 4% bottoms to give a lubricating oil of satisfactory color, color stability, and oxidation stability without the use of large amounts of clay.

2. The method of claim 1 wherein the redistilled oil is given a light clay treatment.

3. The method of claim 1 wherein the redistillation is effected under vacuum at temperatures lower than about 680° F.

4. The method of claim 1 wherein the bottoms from the redistillation step are mixed with the asphalt which is separated in the deasphalting step.

5. The method of preparing high quality lubricating oil from lubricating oil stocks which are substantially free from asphalt but which contain naphthenic constituents, objectionable color bodies and sludge forming constituents, and paraffinic constituents, which method comprises extracting said oil with a selective solvent to obtain a raffinate having a viscosity index of at least 92, and redistilling said raffinate under non-cracking conditions to obtain 4% bottoms to give a lubricating oil of good color, color stability and oxidation stability without the use of large amounts of clay.

JOHN A. ANDERSON.